(12) United States Patent
Tischler

(10) Patent No.: US 8,065,457 B2
(45) Date of Patent: Nov. 22, 2011

(54) DELAYED MEMORY ACCESS REQUEST ARBITRATION

(75) Inventor: Brett A. Tischler, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 894 days.

(21) Appl. No.: 11/222,615

(22) Filed: Sep. 9, 2005

(65) Prior Publication Data

US 2007/0067532 A1  Mar. 22, 2007

(51) Int. Cl.
*G06F 13/14* (2006.01)
*G06F 13/00* (2006.01)
*G06F 13/28* (2006.01)

(52) U.S. Cl. ........ 710/240; 710/107; 711/158; 711/163; 711/167

(58) Field of Classification Search .................. 710/240, 710/107; 711/158, 163, 167
See application file for complete search history.

(56) References Cited

U.S. PATENT DOCUMENTS

| | | | | |
|---|---|---|---|---|
| 4,400,771 A | * | 8/1983 | Suzuki et al. | 711/151 |
| 5,524,220 A | * | 6/1996 | Verma et al. | 712/207 |
| 6,105,086 A | * | 8/2000 | Doolittle et al. | 710/52 |
| 6,134,625 A | * | 10/2000 | Abramson | 710/241 |
| 6,453,401 B1 | * | 9/2002 | Barth et al. | 711/167 |
| 6,594,730 B1 | * | 7/2003 | Hum et al. | 711/137 |
| 7,093,094 B2 | * | 8/2006 | Cismas | 711/169 |
| 7,099,972 B2 | * | 8/2006 | Chao | 710/118 |
| 7,133,981 B2 | * | 11/2006 | Hill et al. | 711/158 |
| 2003/0070018 A1 | * | 4/2003 | Lai et al. | 710/107 |
| 2003/0159013 A1 | * | 8/2003 | Frank et al. | 711/169 |
| 2003/0185032 A1 | * | 10/2003 | Zagorianakos et al. | 365/63 |
| 2004/0034749 A1 | * | 2/2004 | Jeddeloh | 711/154 |

FOREIGN PATENT DOCUMENTS

WO 98/15897 A1 4/1998

* cited by examiner

*Primary Examiner* — Mark Rinehart
*Assistant Examiner* — Christopher Daley

(57) ABSTRACT

A method for delayed memory access request arbitration includes dispatching a first memory access request to a memory controller and dispatching a second memory access request to the memory controller in response to an anticipated completion of a memory access operation represented by the first memory access request. Another method includes receiving a first memory access request at a bus interface unit at a first time, dispatching a second memory access request to a memory controller at a second time subsequent to the first time, receiving a third memory access request at the bus interface unit at a third time subsequent to the second time, dispatching the third memory access request to the memory controller at a fourth time subsequent to the third time and dispatching the first memory access request to the memory controller at a fifth time subsequent to the fourth time.

17 Claims, 4 Drawing Sheets

DELAYED MEMORY ACCESS REQUEST ARBITRATION

FIELD OF THE DISCLOSURE

The present disclosure relates generally to processing memory access requests.

BACKGROUND

Memory controllers frequently are utilized in processing systems to control access to memory resources for devices seeking to store data to memory or access data from memory. In conventional systems, memory access requests are supplied to the memory controller as soon as the memory controller is available to accept memory access requests. The memory controller typically then buffers the memory access requests and processes the buffered memory access requests based on certain assigned priorities. However, due to the conventional technique of dispatching memory access requests to the memory controller as soon as the memory controller is capable of buffering or processing the next memory access request, certain higher-priority memory access requests may not be processed in the most efficient manner if they become available for selection after the memory controller first becomes capable of receiving the next memory access request. To illustrate, in the event that a higher-priority memory access request is received shortly after the dispatch of a lower-priority memory access request due to the availability of the memory controller to accept the next request, processing of the higher-priority memory access request may be delayed until the memory controller is again capable to accept the next memory access request.

Accordingly, an improved technique for processing memory access requests would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving the arbitration of memory access requests. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with one aspect of the present disclosure, a method for delayed memory access request arbitration includes dispatching a first memory access request to a memory controller and dispatching a second memory access request to the memory controller in response to an anticipated completion of a memory access operation represented by the first memory access request.

In accordance with another aspect of the present disclosure, a method includes receiving a first memory access request at a bus interface unit at a first time, dispatching a second memory access request to a memory controller at a second time subsequent to the first time, receiving a third memory access request at the bus interface unit at a third time subsequent to the second time, dispatching the third memory access request to the memory controller at a fourth time subsequent to the third time and dispatching the first memory access request to the memory controller at a fifth time subsequent to the fourth time.

In accordance with an additional aspect of the present disclosure, a system comprises a memory controller coupled to a memory, the memory controller to process memory access requests and a bus interface unit coupled to the memory controller. In one embodiment, the bus interface unit comprises a buffer to store one or more memory access requests and an arbiter having a first input coupled to the buffer to receive memory access requests and a second input to receive a signal from the memory controller, wherein the arbiter is to select a second memory access request for dispatch to the memory controller in response to the signal. The memory controller provides the signal in response to an anticipated completion of a memory access operation represented by a first memory access request previously dispatched to the memory controller.

Figure 1:
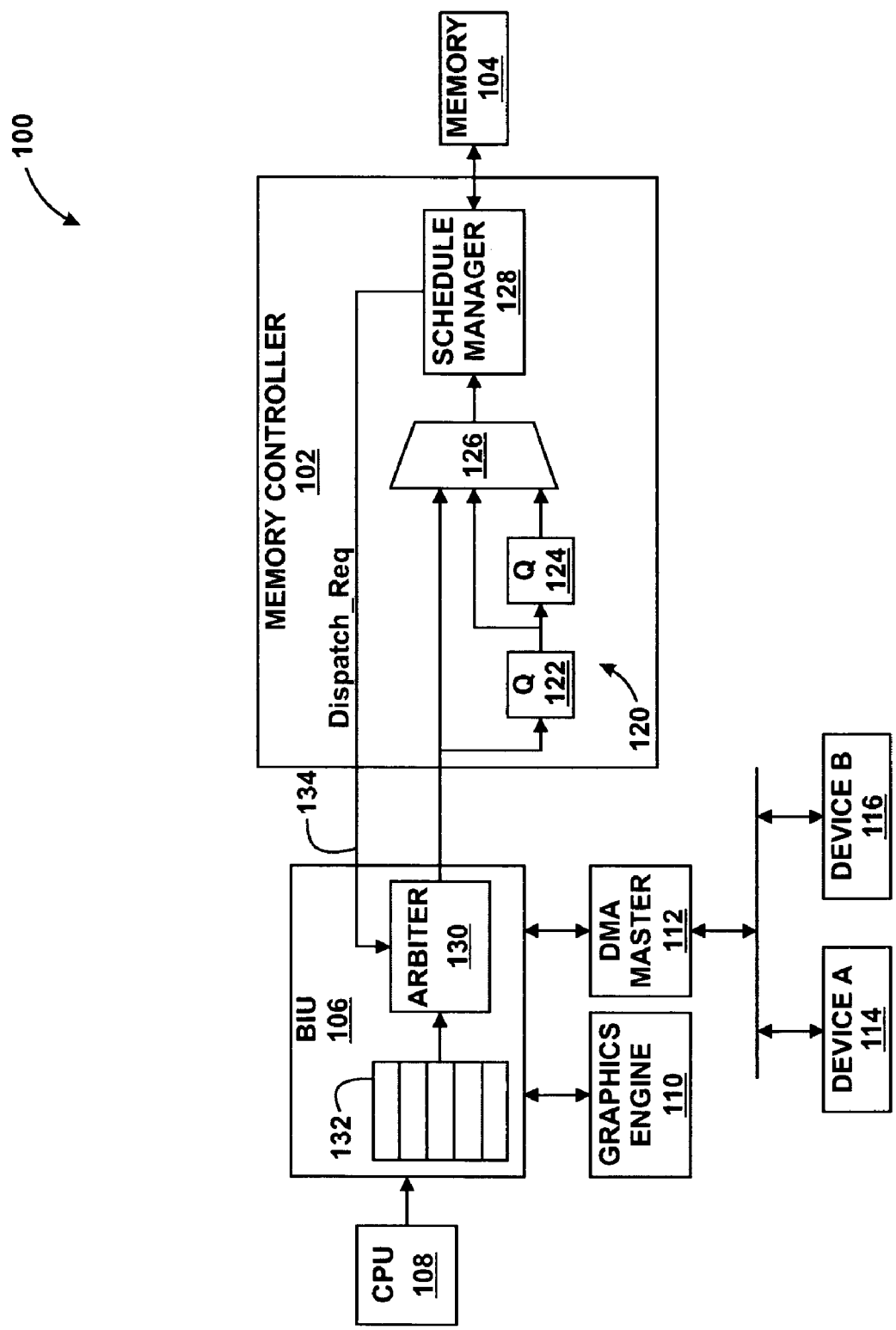
FIG. 1 is a block diagram illustrating an exemplary processing system using a delayed memory access request dispatch technique in accordance with at least one embodiment of the present disclosure.

Referring now to FIG. 1, an exemplary processing system 100 utilizing delayed memory access request dispatching is illustrated in accordance with at least one embodiment of the present disclosure. In the depicted example, the system 100 includes a memory controller 102, memory 104 (e.g., DRAM or SRAM), a bus interface unit (BIU) 106 and one or more components connected to the BIU 106, such as, for example, central processing unit (CPU) 108, graphics engine 110 and one or more direct memory access (DMA) masters 112, which in turn may be connected to one or more devices 114, 116. The memory controller 102, in one embodiment, includes a memory access request queue 120 having one or more queue entries (e.g., queue entries 122, 124), a selector 126 and a schedule manager 128. The BIU 106, in one embodiment, includes an arbiter 130 and a memory access request queue 132 to buffer memory access requests from devices connected to the BIU 106, such as the CPU 108, the graphics engine 110, and the DMA master 112. The arbiter 130, in one embodiment, is responsive to a dispatch_req signal 134 provided by the schedule manager 128 or another component of the memory controller 102.

In operation, the BIU 106 receives memory access requests from one or more of the devices connected to the BIU 106 and buffers the memory access requests in the queue 132. Based on various characteristics, such as priorities assigned to the memory access requests or the sequence of which the memory access requests were received at the BIU 106, the arbiter 130 selects a memory access request from the queue 132 and dispatches it to the memory controller 102 for processing. Buffered memory access requests at the queue 120 may be processed in order or alternately out of order (using the selector 126) based on certain characteristics of the memory access requests such as priority or scheduling as determined by the scheduling manager 128. Upon receipt of a selected memory access request, the schedule manager 128 processes the selected memory access request to execute a memory access operation represented by the selected memory access request. The memory access operation may include, for example, a write operation whereby data is written to the memory 104 or a read operation whereby data is read from the memory 104.

When the schedule manager 128 initiates the processing of a selected memory access request the memory controller 102 becomes capable of receiving another memory access request from the BIU 106, at one of the queue entries 122, 124 vacated by the selected memory access request that is being processed or directly via the selector 126. However, rather than directing the arbiter 130 to select the next memory access request for dispatch as soon as the memory controller 102 is capable of receiving the next memory access request from the BIU 106, the schedule manager 128, in one embodiment, delays signaling the arbiter 130 for the next memory access request until the memory access operation currently being processed using the memory 104 is near completion (i.e., until an anticipated completion of the memory access operation). Upon determining that the current memory access operation completion is eminent, the schedule manager 128 asserts the dispatch_req signal 134, thereby signaling the arbiter 130 to dispatch the next memory access request to the memory controller 102. In response to the signal 134, the arbiter 130 selects a memory access request from the queue 132 based on one or more characteristics, such as priority or time stamps, and dispatches the selected memory access request to the memory controller 102 for temporary buffering and subsequent processing. Thus, rather than directing the arbiter 130 to dispatch a memory access request immediately following an opening for a memory access request at the memory controller 102 as practiced by conventional systems, the processing system 100 of FIG. 1 implements a delayed arbitration technique whereby the next memory access request to be dispatched to the memory controller is not selected until approximately the last possible moment before it is necessary to select one so that any higher-priority memory access requests that are received at the BIU 106 subsequent to the first possible moment that the memory controller 102 can accept a memory access request can be available for selection by the arbiter 130 and dispatch to memory controller 102, thereby increasing the efficiency of the system 100.

The schedule manager 128 may determine the anticipated completion of a memory access operation in order to signal the arbiter 130 to dispatch the next memory access request using any of a variety of techniques. In one embodiment, the anticipated completion of a memory access operation may be represented using signaling between the memory 104 and the memory controller 102. For example, during a read access operation the memory 104 may provide a signal to the memory controller 102 indicating that the requested data is available on the bus lines connecting the memory controller 102 and the memory 104 so that the data may be latched during the next clock cycle. Accordingly, in this instance, upon receipt of this signal from the memory 104 the memory controller 102 may assert the dispatch_req signal 134 thereby signaling the arbiter 130 to initiate the dispatch of the next memory access request. In another example the memory access operation may include a write access operation and the signaling may include a signal provided to the memory controller to the memory that the write data is being placed on the bus connecting the memory controller 102 and the memory 104, and in response to which the memory 104 latches the data during the next cycle. In this instance the schedule manager 128 could assert the signal 134 in response to an assertion of the write data available signal provided to the memory 104 or from the memory 104 to the memory controller 102. In another embodiment, some or all of the memory access operations processed by the memory controller 102 may have predetermined durations. To illustrate, certain types of read access operations may be known by the memory controller 102 to require a set number of clock cycles. Accordingly, the anticipated completion of such read access operations may be represented by a predetermined duration before the actual expected completion of the memory access operation. For example, if a memory access operation is known to take eight clock cycles, the anticipated completion of the memory access operation may occur at, for example, the seventh clock cycle, at which time the schedule manager 128 may assert the dispatch_req signal 134 to signal the arbiter 130 to dispatch the next memory access request to the memory controller 102.

Figure 2:
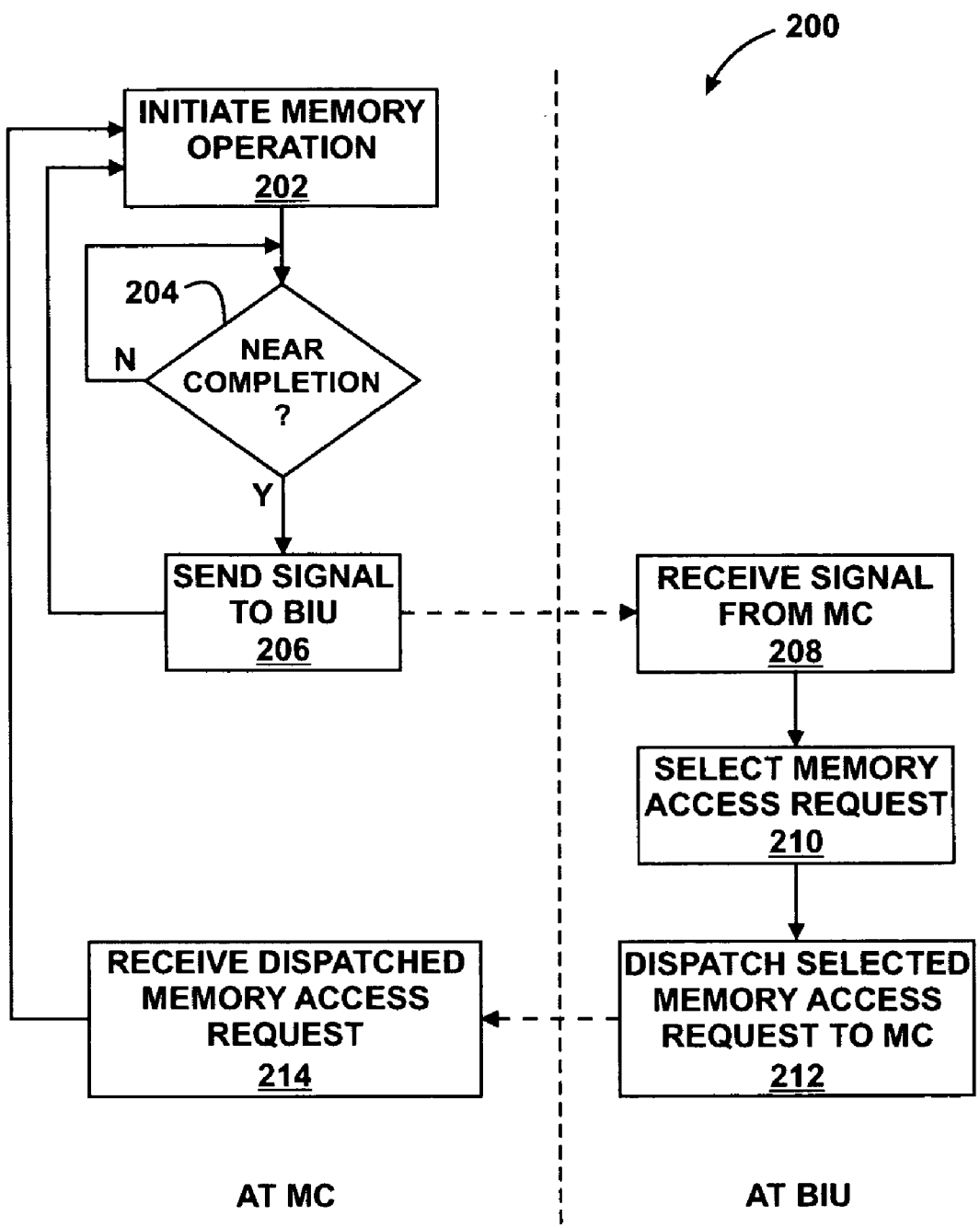
FIG. 2 is a flow diagram illustrating an exemplary method for delayed memory access request dispatch in accordance with at least one embodiment of the present disclosure.

Referring to FIG. 2, an exemplary method 200 for delayed memory access request dispatch to a memory controller is illustrated in accordance with at least one embodiment of the present disclosure. The method 200 initiates at block 202 wherein the memory controller 102 initiates a memory access operation on the memory 104 that is represented by a selected memory access request received from the BIU 106. At block 204 the schedule manager 128 monitors the memory access operation and when the schedule manager 128 identifies an anticipated completion of the current memory access operation, the schedule manager 128 asserts the dispatch_req signal 134 or otherwise signals the arbiter 130 to initiate the dispatch of the next memory access request from the BIU 106 at block 206. At block 208 the arbiter 130 receives the asserted dispatch_req signal 134. In response, at block 210 the arbiter 130 selects a memory access request from the queue 132 for dispatch to the memory controller 102. As noted above, the arbiter 130 may select the next memory access request based on various characteristics, such as priority order in which the memory access requests are received at the BIU 106, and the like. At block 212 the arbiter 130 dispatches the selected memory access request to the memory controller 102. At block 214 the dispatched memory access request is received at the memory controller 102 and can be buffered in the memory access request queue 120 or provided directly to the schedule manager 128 for immediate processing using the selector 126, which may be controlled by the schedule manager 128 or other component of the memory controller 102.

Figure 3:
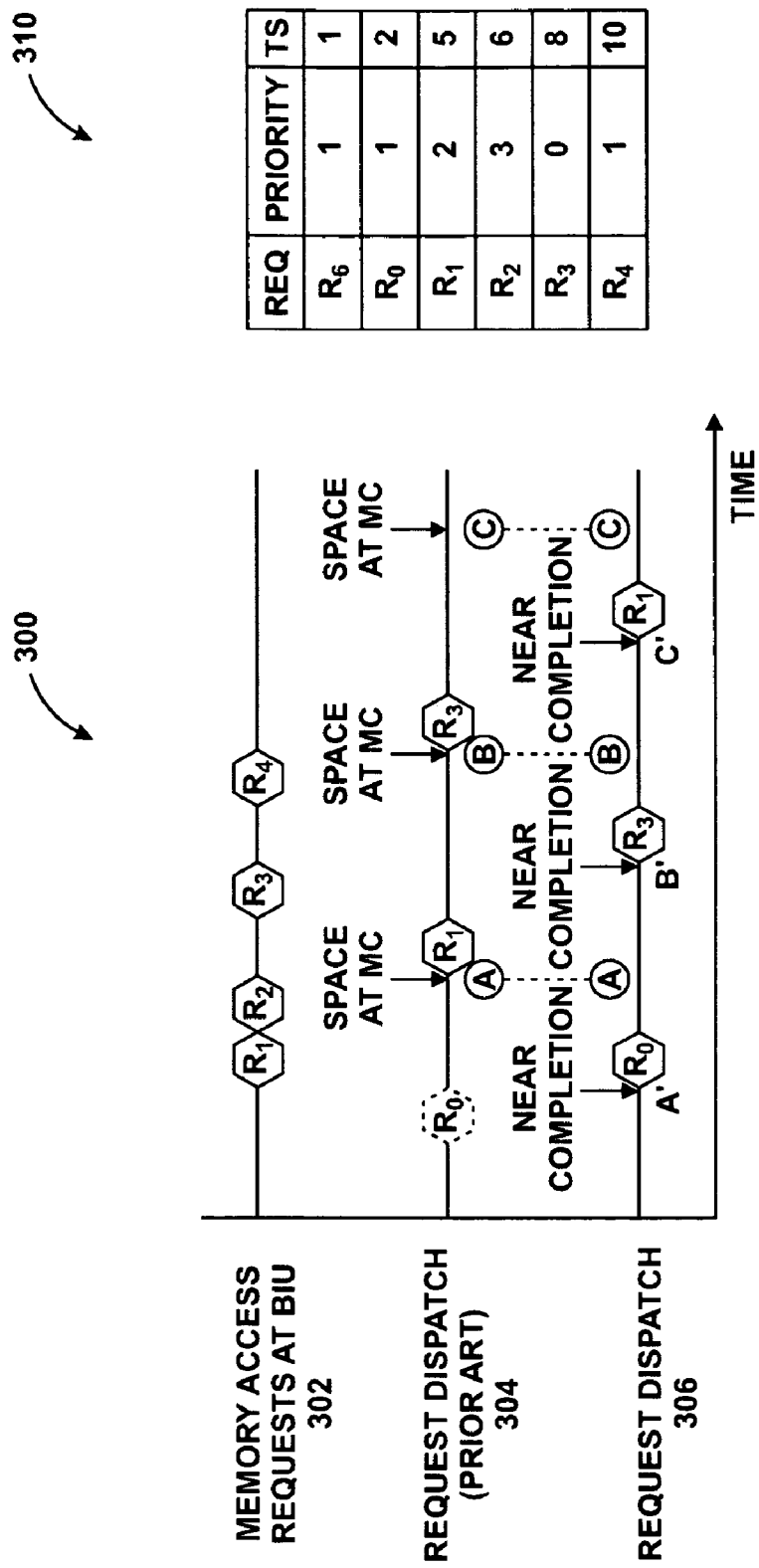
FIG. 3 is a timing diagram and priority chart illustrating an exemplary implementation of the method of FIG. 2 in accordance with at least one embodiment of the present disclosure.
Figure 4:
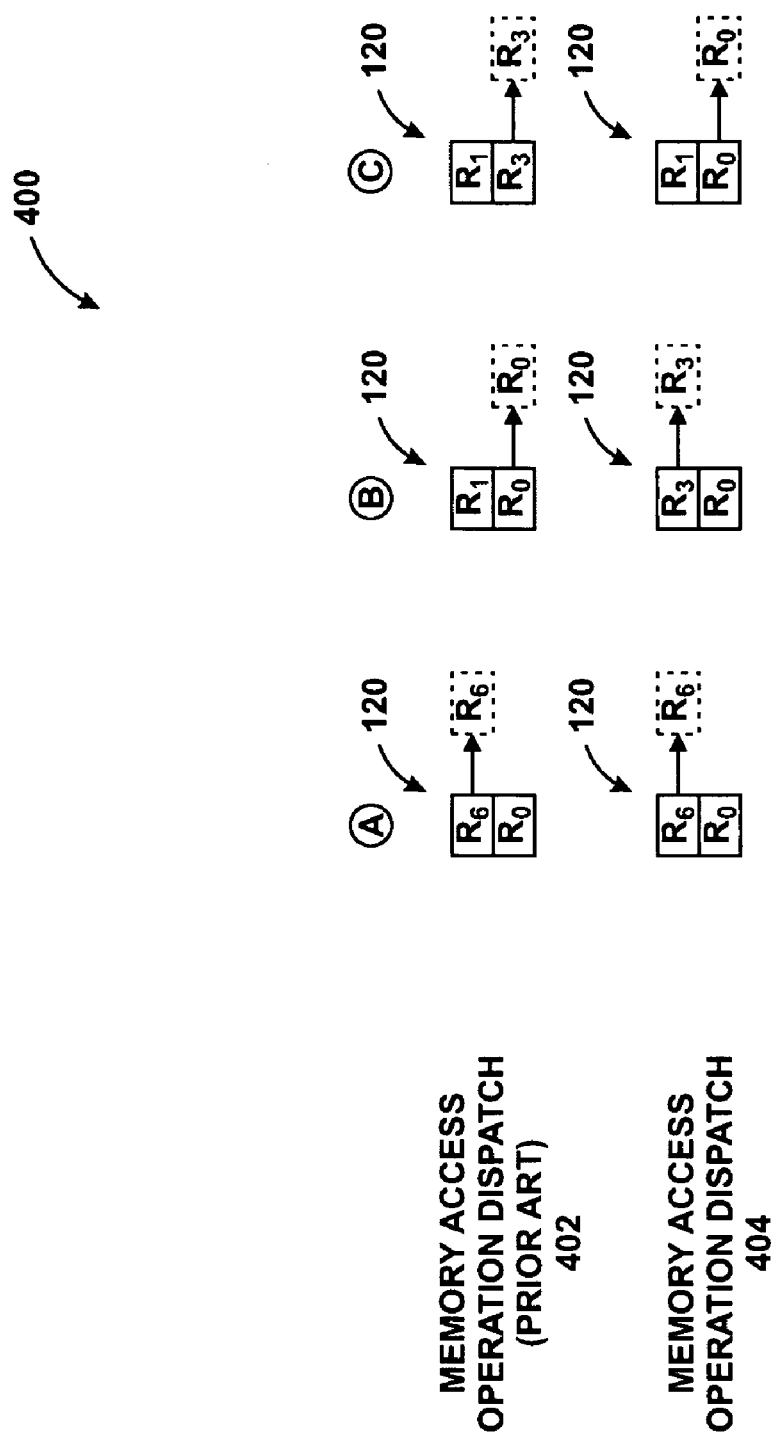
FIG. 4 is a diagram illustrating exemplary states of a memory controller queue corresponding to the timing diagram of FIG. 3 in accordance with at least one embodiment of the present disclosure.

Referring to FIGS. 3 and 4, an exemplary implementation of the method of FIG. 2 in the system of FIG. 1 is illustrated in accordance with at least one embodiment of the present disclosure. FIG. 3 illustrates a timing diagram 300 having a sequence 302 representing the receipt of memory access requests at the BIU 106, a sequence 304 representing the conventional technique for dispatching memory access requests to a memory controller, and a sequence 306 representing a technique for dispatching memory requests to the memory controller 102 in accordance with at least one embodiment of the present disclosure. FIG. 3 further illustrates an exemplary characteristic chart 310 that can be maintained by the arbiter 130 and used by the arbiter 130 in selecting memory access requests for dispatch to the memory controller 102. FIG. 4 illustrates exemplary states of the queue 120 of the memory controller 102 at various points of the timing diagram 300 for both the conventional dispatch sequence 304 and the delayed dispatch sequence 306. For ease of illustration, it is assumed that memory access requests are obtained from the two queue entries 122, 124 of the queue 120 for further processing by the memory controller 102.

The sequence 302 depicts the receipt of memory access requests $R_1$-$R_4$ at the BIU 106. As illustrated, the memory access requests $R_1$ and $R_2$ are received prior to point A and the memory access requests $R_3$ and $R_4$ are received between points A and B. Although not illustrated, it is assumed that requests $R_0$ and $R_6$ are received prior to the receipt of the memory access request $R_1$ at the BIU 106. As the chart 310 illustrates, the memory access requests $R_6$ and $R_0$ have a priority of 1, the memory access request $R_1$ has a priority of 2, the memory access request $R_2$ has a priority of 3, the memory access request $R_3$ has a priority of 0, and the memory access request $R_4$ has a priority of 1, where a priority of 0 represents the highest priority and the priority of 3 represents the lowest priority. In the timing diagram 300, points A, B and C represent the points at which the memory controller 102 initiates the processing of a memory access operation represented by a memory access request at the memory controller 102 and therefore represent times at which the memory controller 102 first becomes capable of receiving another memory access request from the BIU 106. The points A', B' and C', respectively, represent the points at which the schedule manager 128 identifies an anticipated completion of the memory access operation being processed.

As noted above, the conventional memory dispatch technique is implemented such that a memory access request is dispatched to a memory controller as soon as the memory controller is capable of receiving another memory access request. As illustrated by the sequence 304 representing this conventional technique immediately after point A the memory access request having the highest priority that is buffered at a BIU at that point (memory access request $R_1$ in this example) is dispatched to a memory controller for processing. Likewise, once space again becomes available at the memory controller of the conventional technique at point B, the conventional dispatch sequence 304 illustrates that the highest priority memory access request buffered at point B is selected for dispatch (memory access request $R_3$ in this case). However, as noted above this conventional technique as represented by dispatch sequence 304 often provides a less efficient scheduling of memory access requests. For example, assume that memory access request $R_3$ is a higher-priority memory access request from the CPU 108 (FIG. 1), whereas memory access requests $R_1$ and $R_2$ are lower-priority memory access requests from, for example, devices connected to the DMA master 112. In the conventional dispatch sequence 304, the memory access request $R_1$ is dispatched and processed at the memory controller 102 prior to the dispatch and processing of the memory request $R_3$, (even though the memory access request $R_3$ has a higher-priority than the memory access request $R_1$) due to the situation that the memory access request $R_3$ was received at a time subsequent to point A where the memory controller was first capable of receiving a memory access request from a bus interface unit and therefore was not available for selection for dispatch due to its subsequent receipt.

In contrast, the dispatch sequence 306 representing an exemplary implementation of the method 200 of FIG. 2 illustrates that by delaying arbitration and selection of a memory access request until approximately the latest possible moment at the memory controller 102 (which can be represented by an anticipated completion of a memory access operation being performed by the memory controller 102), a more effective arbitration of memory access requests may be achieved. To illustrate, the schedule manager 128 determines that the memory access operation currently being processed is near completion at point A'. In response, the schedule manager 128 asserts dispatch_req signal 134 that is received by arbiter 130. In response to the assertion of signal 134, the arbiter 130 selects from the memory access requests in the queue 130 available at that time (i.e., memory access requests $R_6$ and $R_0$). In this case, the memory access request $R_0$ has a higher-priority than the memory access request $R_6$ and therefore is selected by the arbiter 130 for dispatch to the memory controller 102. The sequence 306 continues to point A where the memory controller 102 completes its current memory access operation, but unlike conventional techniques, the schedule manager 128 does not signal for the next memory access request even though the memory controller 102 has become capable of receiving another memory access request. Instead, the schedule manager 128 waits until the anticipated completion of the next memory access operation at point B', at which time it asserts signal 134. In response to the assertion of signal 134 at point B' the arbiter selects the next memory access request for dispatch to the memory controller 102. As illustrated in sequence 302 the delay between point A when the memory controller 102 is first capable of receiving the next memory access request to point B' when the current memory access operation is nearing completion at the memory controller 102 allows for the BIU 106 to receive high-priority memory access request $R_3$. Accordingly in response to the assertion of the signal 134 at point B' the arbiter 130 has available in its queue 132 the memory access request $R_3$ and as it is the highest-priority request in the queue 132, the arbiter 130 selects the memory access request $R_3$ for dispatch to the memory controller 102 following point B'. Similarly when the memory access operation being performed by memory controller 102 is nearing completion at point C', the schedule manager 128 asserts the signal 134, in response to which the arbiter 130 selects the memory access request $R_1$ for dispatch to memory controller 102.

As illustrated by FIG. 4, the delayed selection and dispatch of memory access requests typically results in a more effective scheduling of memory access requests at the memory controller 102. To illustrate, at point B in the conventional dispatch sequence 304 the memory controller selects a memory access request from its queue for processing. As illustrated by the memory access queue state 402, a memory controller utilizing the conventional technique would have memory access requests $R_1$ and $R_0$ in its queue at point B, from which the memory access request $R_0$ typically would be selected for processing due to its higher-priority. Further, the memory access request queue of a memory controller utilizing the conventional technique would have memory access requests $R_1$ and $R_3$ from which the memory access request $R_3$ typically would be selected due to its highest priority. In contrast, as illustrated by the memory access queue state 404, the memory controller 102 utilizing the delayed memory access request dispatch technique disclosed herein would have in its queue 120 the memory access request $R_3$ at point B, from which the memory access request $R_3$ would be selected for processing, and at point C the queue 120 would contain memory access requests $R_1$ and $R_0$ from which the memory access request $R_0$ would be selected for processing. Accordingly, as FIGS. 3 and 4 illustrate, the delayed memory access request dispatch technique disclosed herein would result in the highest-priority memory access request $R_3$ being processed earlier than it would in a processing system utilizing the conventional dispatch technique. Thus, the delayed memory access request dispatch technique disclosed herein frequently permits a more efficient sequencing of memory access requests compared to conventional techniques whereby memory access requests are immediately dispatched as soon as the memory controller is capable of receiving them.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
dispatching a first memory access request to a memory controller;
dispatching a second memory access request to the memory controller;
initiating a first memory access operation by the memory controller based upon the second memory access request; and
dispatching a third memory access request to the memory controller at a predetermined duration after an earliest time that the memory controller can receive a next memory access request responsive to the memory controller initiating the first memory access operation and before an actual completion of the first memory access operation, and before the memory controller initiating a second memory access operation based upon the first memory access request.

2. The method of claim 1, wherein the second memory access request comprises a read access request.

3. The method of claim 1, wherein the first second access request comprises a write access request.

4. The method of claim 1, wherein dispatching the third memory access request to the memory controller comprises selecting the third memory access request from a plurality of memory access requests available to be provided to the memory controller.

5. The method of claim 4, wherein the third memory access request is selected based on priorities associated with the plurality of memory access requests.

6. The method of claim 1, wherein dispatching the third memory access request comprises providing a signal from the memory controller to a bus interface unit at the predetermined duration, wherein the bus interface unit selects the third memory access request from a plurality of memory access requests in response to receiving the signal.

7. A method comprising:
dispatching a first memory access request from a bus interface unit to a memory controller at a first time;
dispatching a second memory access request from the bus interface unit to a memory controller at a second time subsequent to the first time;
receiving a third memory access request at the bus interface unit at a third time subsequent to the second time;
dispatching the third memory access request to the memory controller at a fourth time subsequent to the third time, the fourth time occurring at a predetermined duration before an actual completion of a memory access operation based upon the second memory access request, wherein the memory access operation based upon the second memory access request is initiated by the memory controller prior to a memory access operation based upon the first memory access request.

8. The method of claim 7, wherein dispatching the third memory access request includes selecting the third memory access request from a plurality of memory access requests at the bus interface unit for dispatch to the memory controller, wherein the plurality of memory access requests includes the first memory access request.

9. The method of claim 8, wherein the third memory access request is selected for dispatching based on a priority associated with the third memory access request.

10. The method of claim 7, further comprising:
receiving a fourth memory access request at the bus interface unit at a fifth time prior to the third time; and
wherein dispatching the third memory access request occurs prior to dispatching the fourth memory access request.

11. The method of claim 10 further comprising initiating at the memory controller a memory access operation based upon the third memory access request before initiating a memory access operation based upon the first memory access request.

12. The method of claim 7, wherein upon receiving the third memory access request there are a plurality of access requests pending at the bus interface unit and the third memory access request has the highest priority amongst the plurality of access requests.

13. A system comprising:
a bus interface unit comprising:
a buffer to store one or more memory access requests; and
an arbiter having a first input coupled to the buffer to receive memory access requests and a second input to receive a signal, wherein the arbiter is to select a next memory access request for dispatch to in response to the signal; and
a memory controller coupled to the bus interface unit and to a memory, the memory controller comprising a buffer to store a plurality of memory access requests dispatched from the bus interface unit, including a highest priority memory access request that is received at the buffer of the memory controller subsequent a lower priority memory access request, the memory controller to initiate a current memory access operation based upon the highest priority memory access request prior to initiating a memory access operation based upon the lower priority memory access request, and to provide the signal to the bus interface unit a predetermined duration after a buffer location becomes available at the buffer of the memory controller, responsive to initiating the current memory access operation, and before an actual completion of the current memory access operation.

14. The system of claim 13, wherein the current memory access request comprises a read access request.

15. The system of claim 13, wherein the current memory access request comprises a write access request.

16. The system of claim 13, wherein the arbiter selects the next memory access request based on priorities associated with the one or more memory access requests.

17. The system of claim 16, wherein priorities are associated with memory requests from a central processing unit.

* * * * *